Feb. 12, 1952   R. O. WONDRA   2,585,204
SHUTOFF MECHANISM FOR AN INJECTION NOZZLE
Filed Dec. 2, 1949   2 SHEETS—SHEET 1
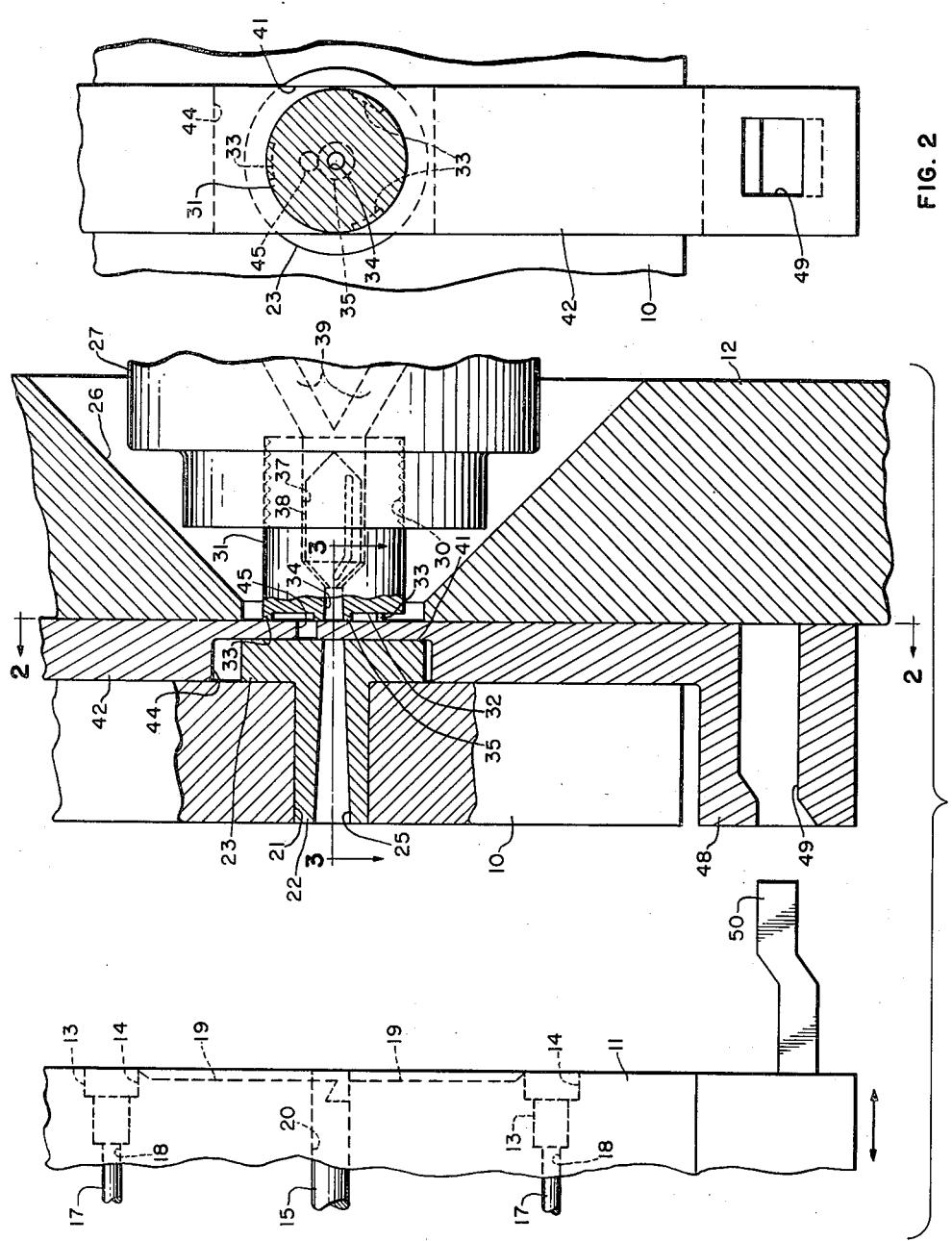
INVENTOR
RAYMOND O. WONDRA
BY *E.F.Kane*
ATTORNEY Feb. 12, 1952 R. O. WONDRA 2,585,204
SHUTOFF MECHANISM FOR AN INJECTION NOZZLE
Filed Dec. 2, 1949 2 SHEETS—SHEET 2
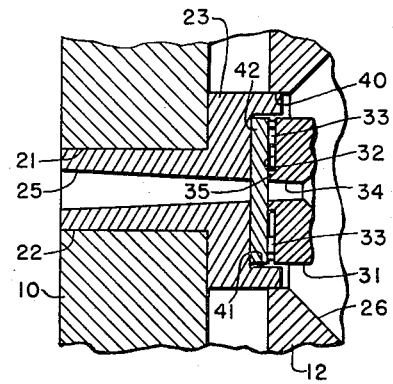
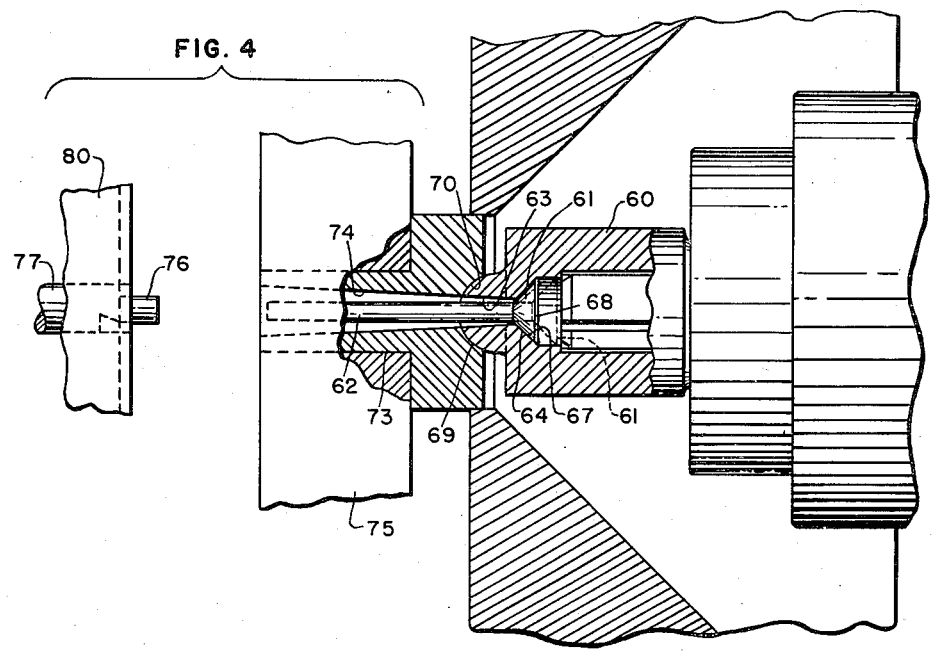
INVENTOR
RAYMOND O. WONDRA
BY E. F. Kane
ATTORNEY Patented Feb. 12, 1952

2,585,204

UNITED STATES PATENT OFFICE 2,585,204

SHUTOFF MECHANISM FOR AN INJECTION NOZZLE

Raymond O. Wondra, Chicago, Ill., assignor to Western Electric Company, Incorporated, New York, N. Y., a corporation of New York Application December 2, 1949, Serial No. 130,673

2 Claims. (Cl. 18—30)

This invention relates to injection molding apparatus and more particularly to a shut-off mechanism for the injection nozzle orifice of such an apparatus.

The invention is particularly useful in an injection molding apparatus when molding articles of a plastic material which has a comparatively small temperature range for molding and a sharp melting point, such as, for example, nylon plastic molding material. In the molding of such material, it has been difficult to prevent seepage or oozing of the liquid material at the nozzle orifice during the period when the molding dies are opened to remove the molded article and until the following injection is started.

An object of this invention is the provision of a simple, reliable and practicable shut-off mechanism for preventing oozing of the liquid material from the nozzle orifice of molding dies.

In accordance with the above object, this invention contemplates, in one embodiment thereof, a nozzle orifice shut-off mechanism comprising a movable plate having an aperture therein for registration with the nozzle orifice and sprue-defining entrance to the stationary die section of an injection molding apparatus during the injection operation while the dies of the apparatus are closed and movable to shut off the nozzle orifice in timed relation to the opening or separation of the dies. A cam-shaped actuator carried by the movable die section upon entering and being withdrawn from a cam-shaped slot in the movable plate serves to actuate such plate in timed relation to the closing and opening of the dies, respectively.

In an alternative embodiment of the invention, a movable valve having a stem is freely fitted into the nozzle and a tapered peripheral valve surface cooperates with a correspondingly tapered surface formed in the nozzle at the inner end of the nozzle orifice when the valve is closed by the pressure of the liquid molding material against a flat inner end face of the valve to shut off the nozzle orifice to the sprue-defining entrance to the stationary die section when the dies are opened. The valve stem which extends into the sprue-defining entrance to the stationary die section is peripherally spaced from the surface defining the nozzle orifice as well as that of the sprue-defining entrance to permit passage of the liquid molding material into the dies when the dies are closed. For opening the nozzle shutoff valve against the pressure of the liquid molding material, a pin carried by the movable die section engages the outer free end of the valve stem in timed relation to the closing of the dies and in timed relation to the separation of the dies the pressure of the liquid molding material is permitted to close the valve.

Other objects and advantages of this invention will more fully appear from the following detailed description taken in conjunction with the accompanying drawings, in which Fig. 1 is a fragmentary side view, partly in section, of a plastics injection molding apparatus showing a nozzle orifice shut-off mechanism embodying the features of this invention applied thereto;

Fig. 2 is an irregular, vertical, sectional view taken on the line 2—2 of Fig. 1;

Fig. 3 is a detailed, plan, sectional view taken on the line 3—3 of Fig. 1; and

Fig. 4 is a fragmentary, central, sectional view, partly in elevation, of a nozzle orifice shut-off mechanism showing another embodiment of the invention.

Referring now to the drawing, and particularly to Fig. 1, a portion of a plastics injection molding apparatus is shown in which the numerals 10 and 11 indicate stationary and movable die sections, respectively, which are shown fragmentarily in open or separated relation. The die section 10 is fixed to a stationary vertical plate 12, and the die section 11 is suitably mounted for sliding movement to and from the die section 10 by suitable means not shown. For purposes of illustration, a simple set of die sections 10 and 11 has been selected for simultaneously molding several cylindrical articles or work pieces 13 arranged in a circle about a common center, the articles being molded to the configuration of molding cavities 14, shown in dotted outline, which are formed in the right-hand flat face of the die section 11, which is the parting line of the die sections when they are closed. Reciprocable knock-out pins 17 are carried in apertures 18 formed in the die section 11 in alignment with each of the molding cavities 14 with their right-hand end faces in the plane of the inner end faces of the cavities and, therefore, of the inner end faces of the molded articles. It will be understood that the left-hand face of the stationary die section 10 provides the end walls of the molding cavities 14 when the die sections are closed during the molding operation. Runners 19 extend from a central opening 20 in the die section 11 to each of the molding cavities 14 and a usual type of sprue puller 15 is reciprocably mounted in the opening 20.

Fitted in an aperture 21 in the stationary die section 10 is a sprue bushing 22 formed with a flange or head 23 and a flaring gate 25, which, at its outer end, is arranged in the plane of the left-hand face of the die section 10 and opens into the central opening 20 of the movable die section 11 when the die sections are closed. Extending into a flared and shouldered opening 26 in the stationary plate 12 is a charging and heating chamber 27 for the molding material, the chamber being shown fragmentarily. Fixed in a bore 30 of the chamber 27 is an injection nozzle 31 having a flat outer end face 32 provided with three equally-spaced lands 33 and a flared outlet orifice 34 having a circular surrounding land 35, the outer flat faces of the lands being in the plane of the vertical end surface of the stationary plate 12. Within a counterbore 37 of the nozzle 31 and communicating with the orifice 34 thereof is a member 38, so shaped and arranged that the liquid molding material directed thereagainst from passageways 39 of the heating chamber 27, which communicate with the nozzle counterbore 37, will flow along its periphery and into the nozzle orifice 34 during the injection operation.

The right-hand end (Fig. 3) of the sprue bushing head 23 extends slightly into an outer reduced portion 40 of the flared opening 26 of the stationary plate 12, and the bushing is formed with a vertically extending slot 41 (Fig. 1) in which is accurately fitted a nozzle orifice shut-off plate 42 (Fig. 3) slidable upon the vertical end surface of the stationary plate 12. Opposite surfaces of the plate 42, which plate is recessed as indicated at 44 at its left-hand side intermediate its length, abut and are slidable upon the lands 33 and 35 of the nozzle 31 and the sprue bushing head 23, and the plate is provided with an aperture or passageway 45, which in one position of the plate; namely, during the injection operation, registers with the nozzle orifice 34 and sprue bushing flaring gate 25. In another position of the plate 42 after the die sections 10 and 11 are separated, as shown in Figs. 1, 2 and 3, the aperture 45 is displaced transversely of the injection nozzle orifice 34 to seal or shut off the same to prevent seeping or oozing of the molding material therefrom during the entire period when the die sections are separated. One end of the plate 42, as shown in Fig. 1, is provided with an enlargement 48 having a cam slot 49 therein for receiving a cam member 50 attached to the right-hand end surface of the reciprocable die section 11. The cam member 50 is so shaped that when it moves into and out of the cam slot 49 during the closing and opening, respectively, of the die sections 10 and 11, it will impart reciprocatory movements to the nozzle orifice shut-off plate 42 in opposite directions. Thus, during the closing of the die sections 10 and 11, the shut-off plate 42 will be shifted to align its aperture 45 with the sprue bushing gate 25 and the injection nozzle orifice 34 in timed relation to and before the operation of ejecting the liquid molding material from the heating chamber 27 and through the injection nozzle orifice 34, sprue bushing gate 25 and into the central opening 20 of the die section 11, along the runners 19 and into the molding cavities 14. During the opening of the die sections 10 and 11 to the position of the movable die section shown in Fig. 1, the injection nozzle orifice shut-off plate 42 will be shifted to displace its aperture 45 out of register with the nozzle orifice 34 to the position shown, and this shifting of the plate will be in timed relation to the actuation of the sprue puller 21 to withdraw the sprue of the molding material extending to the inner end of the nozzle orifice 34. Thus, before the latter shifting of the plate 42 is started, the injection nozzle orifice 34 and the nozzle orifice shut-off plate aperture 45 will be cleaned out of molding material in preparation for the next injection operation and immediately thereafter the nozzle orifice will be shut off by the completion of the shifting of the plate 42, thus preventing seeping or oozing of the liquid material from the nozzle orifice 34 while the die sections 10 and 11 are opened.

It will be understood that, by means of suitable mechanisms well known in the art of plastics injection molding apparatus and constituting no part of this invention, and which it is not believed necessary to disclose herein in order to have a complete understanding of the invention, the required movements in timed relation of the die section 11, ejector pins 18, sprue puller 15 and the injection of the liquid molding material from the nozzle orifice 34 are effected during each cycle of operation of the apparatus.

In the embodiment of the invention shown in Fig. 4, an injection nozzle 60 has a valve 61 fitted therein, a stem 62 of the valve extending through and is suitably peripherally spaced from the wall of a flared outlet orifice 63 of the nozzle. A tapered peripheral surface 64 of the valve 61, when in its closed position, as shown, is seated against a correspondingly tapered surface 67 of the nozzle by the pressure of the liquid molding material against a flat inner end face 68 of the valve. When the valve 61 is moved to its open and dotted outline position, liquid molding material will be ejected through the nozzle orifice 63 along the space surrounding the valve stem 62.

The nozzle 60 has a usual hemispherical nose portion 69, which is seated in a correspondingly shaped recess 70 in a sprue bushing 73, having a flaring gate 74, the outer end of the bushing being in the plane of the left-hand face of a stationary die section 75. For actuating the valve 61 to its open position, shown in dotted outline, a reduced extension 76 on a sprue puller 77 associated with a movable die section 80 engages the outer end face of the valve stem 62 in timed relation to the closing of the die sections and moves the valve 61 to its open position. As illustrated in Fig. 4, the movable die section 80 is shown in an advanced position during the closing of the die section. When the die sections are opened, the sprue puller extension 76 will withdraw from the valve stem 62, whereupon the valve 61 will be immediately moved to its closed position by the pressure of the liquid molding material against the flat end face 68 of the valve, thereby preventing seeping or oozing of the liquid material from the nozzle orifice 63 while the die sections 75 and 80 are opened.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a plastics injection molding apparatus having stationary and movable dies and a nozzle having an orifice for registration with a sprue-defining entrance to the dies, the combination of a movable plate mounted for movement transversely of and between said orifice and sprue-defining entrance, said plate having a passageway for registration with said orifice and sprue-defining entrance in one position of said plate upon said dies being closed, said plate having camming surfaces formed thereon and a cam member carried by the movable die coacting with said surfaces for actuating said plate to move its passageway into and out of register with the nozzle orifice and sprue-defining entrance in timed relation to the closing and separation, respectively, of said dies.

2. In a plastics injection molding apparatus stationary and movable dies and a nozzle having an orifice for registration with a sprue defining entrance to the dies formed in a sprue bushing, the combination of a movable plate mounted for movement transversely of and between said orifice and sprue defining entrance, said plate being guided during its movement in a slot formed in said sprue bushing and slidably bearing on opposed surfaces of said bushing slot and said nozzle, said plate having a passageway for registration with said orifice and sprue defining entrance in one position of said plate upon said dies being closed, camming surfaces formed on said plate, and a cam member movable with the movable die coacting with said cam surfaces for actuating said plate to move its passageway into and out of register with the nozzle orifice and sprue defining entrance in timed relation to the closing and separation, respectively, of said dies.

RAYMOND O. WONDRA.

REFERENCES CITED

The following references are of record in the file of this patent:

UNITED STATES PATENTS

| Number | Name | Date |
|---|---|---|
| 2,253,460 | Hempel | Aug. 19, 1941 |
| 2,318,031 | Tucker | May 4, 1943 |
| 2,436,122 | Rotsler | Feb. 17, 1948 |
| 2,456,423 | Jobst | Dec. 14, 1948 |